(12) United States Patent
Webb et al.

(10) Patent No.: US 9,635,673 B2
(45) Date of Patent: Apr. 25, 2017

(54) BASE STATION AND ASSOCIATED METHOD FOR ASSIGNING UPLINK RESOURCES TO TERMINAL DEVICES WITH A SIMILAR TRAFFIC PROFILE

(71) Applicant: SONY CORPORATION, Tokyo (JP)

(72) Inventors: Matthew Webb, Basingstoke (GB); Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 51 days.

(21) Appl. No.: 14/437,381

(22) PCT Filed: Oct. 21, 2013

(86) PCT No.: PCT/GB2013/052737
§ 371 (c)(1),
(2) Date: Apr. 21, 2015

(87) PCT Pub. No.: WO2014/096765
PCT Pub. Date: Jun. 26, 2014

(65) Prior Publication Data
US 2015/0282155 A1    Oct. 1, 2015

(30) Foreign Application Priority Data
Dec. 19, 2012    (GB) .................................. 1222899.5

(51) Int. Cl.
*H04W 4/00* (2009.01)
*H04W 72/04* (2009.01)
(Continued)

(52) U.S. Cl.
CPC ..... *H04W 72/048* (2013.01); *H04W 72/0453* (2013.01); *H04W 72/121* (2013.01); *H04W 4/005* (2013.01); *H04W 74/006* (2013.01)

(58) Field of Classification Search
CPC ............. H04W 4/005; H04W 72/0453; H04W 72/048; H04W 72/121
See application file for complete search history.

(56) References Cited

U.S. PATENT DOCUMENTS

2008/0232317 A1* 9/2008 Jen ...................... H04W 74/002
370/329
2010/0208709 A1* 8/2010 Kim ..................... H04B 7/0452
370/336

(Continued)

FOREIGN PATENT DOCUMENTS

GB    2487757    8/2012
GB    2487780    8/2012

(Continued)

OTHER PUBLICATIONS

ETSI TS 122 368 v10.5.0, "Digital cellular telecommunications system (Phase 2+); Universal Mobile Telecommunications System (UMTS); LTE; Service requirements for Machine-Type Communications (MTC); Stage 1 (3GPP TS 22.368 version 10.5.0 Release 10)", LTE, (Jul. 2011), pp. 1-17.

(Continued)

*Primary Examiner* — Kan Yuen
(74) *Attorney, Agent, or Firm* — Oblon, McClelland, Maier & Neustadt, L.L.P.

(57) ABSTRACT

A method of allocating radio resources for uplink transmissions in a wireless telecommunications system, including: a first terminal device communicating a request for an allocation of radio resources to a base station; the base station determining whether there is an association between the first terminal device and a second terminal device based on their having similar predicted traffic profiles for uplink data; and the base station establishing a radio resource allocation for the second terminal device based on the resources requested by the first terminal device, and consequently transmitting (Continued)

radio resource allocation messages to allocate radio resources to the first and the second terminal devices for respective uplink transmissions based on the request for an allocation of radio resources received from the first terminal device.

20 Claims, 4 Drawing Sheets

(51) Int. Cl.
*H04W 72/12* (2009.01)
*H04W 74/00* (2009.01)

(56) References Cited

U.S. PATENT DOCUMENTS

| | | | |
|---|---|---|---|
| 2011/0170515 A1 | 7/2011 | Kim | |
| 2011/0223953 A1 | 9/2011 | Lee et al. | |
| 2012/0163235 A1 | 6/2012 | Ho et al. | |
| 2013/0223352 A1* | 8/2013 | Sartori | H04W 76/023 370/329 |
| 2013/0315074 A1* | 11/2013 | Kim | H04W 8/24 370/242 |
| 2014/0010184 A1 | 1/2014 | McNamara et al. | |
| 2014/0078970 A1* | 3/2014 | Guo | H04W 72/005 370/329 |

FOREIGN PATENT DOCUMENTS

| | | |
|---|---|---|
| GB | 2487782 | 8/2012 |
| GB | 2487906 | 8/2012 |
| GB | 2487907 | 8/2012 |
| GB | 2487908 | 8/2012 |
| GB | 2487909 | 8/2012 |
| GB | 2488513 | 9/2012 |
| GB | 2497742 | 6/2013 |
| GB | 2497743 | 6/2013 |
| WO | 2012 102547 | 8/2012 |
| WO | 2012 104630 | 8/2012 |
| WO | 2013 027025 | 2/2013 |

OTHER PUBLICATIONS

Holma, et al., "LTE for UMTS OFDMA and SC-FDMA Based Radio Access", Wiley, (2009), pp. 25-27.
ETSI TS 136 321 v10.6.0, "LTE; Evolved Universal Terrestrial Radio Access (E-UTRA); Medium Access Control (MAC) protocol specification (3GPP TS 36.321 version 10.6.0 Release 10)", LTE, (Oct. 2012), pp. 1-55.
ETSI TS 136 300 v10.8.0, "LTE; Evolved Universal Terrestrial Radio Access (E-UTRA) and Evolved Universal Terrestrial Radio Access Network (E-UTRAN); Overall description; Stage 2 (3GPP TS 36.300 version 10.8.0 Release 10)", LTE, (Jul. 2012), pp. 1-209.
ETSI TS 123 401 v10.8.0, "LTE; General Packet Radio Service (GPRS) enhancements for Evolved Universal Terrestrial Radio Access Network (E-UTRAN) access (3GPP TS23.401 version 10.8.0 Release 10)", LTE, (Jul. 2012), pp. 1-279.
ETSI TS 123 203 v10.7.0, "Digital cellular telecommunications system (Phase 2+); Universal Mobile Telecommunications System (UMTS); LTE; Policy and charging control architecture (3GPP TS 23.203 version 10.7.0 Release 10)", LTE, (Jul. 2012), pp. 1-133.
International Search Report Issued Jan. 29, 2014 in PCT/GB13/052737 Filed Oct. 21, 2013.
Great Britain Search Report Issued Jun. 13, 2013 in Application No. GB 1222899.5 Filed Dec. 19, 2012.
U.S. Appl. No. 14/434,335, filed Apr. 8, 2015, Webb et al.

* cited by examiner

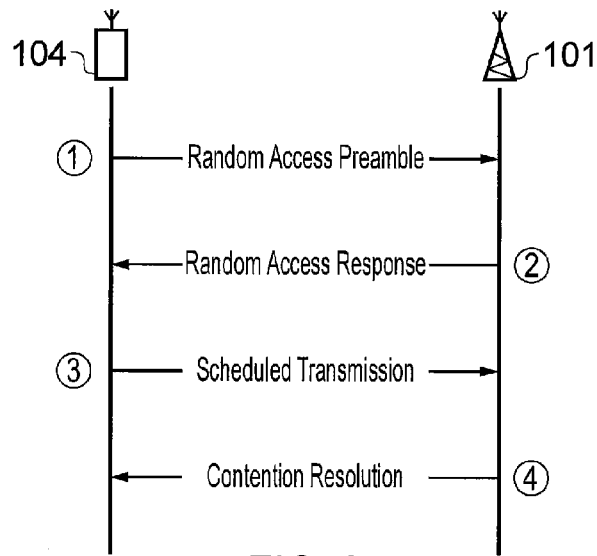
FIG. 2
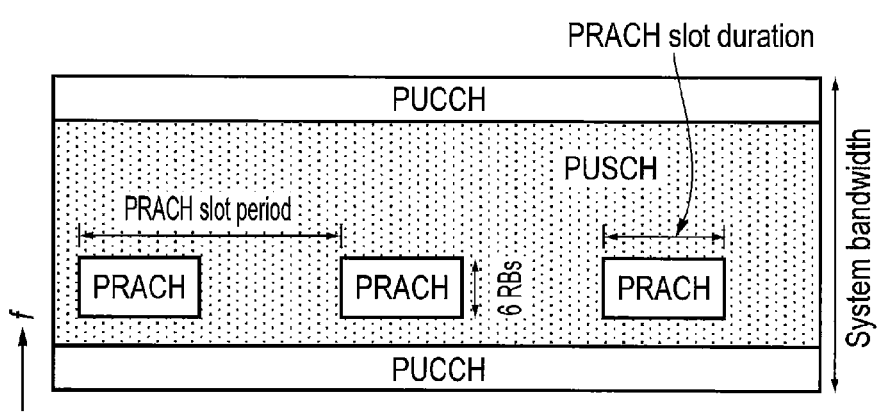
FIG. 3
| Preamble format | $T_{CP}$ (μs) | $T_{SEQ}$ (μs) | $T_{GT}$ (μs) | PRACH slot duration (subframes) |
|---|---|---|---|---|
| 0 | 103.13 | 800 | 96.88 | 1 |
| 1 | 684.38 | 800 | 515.63 | 2 or 3 |
| 2 | 203.13 | 1600 | 196.88 | 2 |
| 3 | 684.38 | 1600 | 715.63 | 3 |
FIG. 4

BASE STATION AND ASSOCIATED METHOD FOR ASSIGNING UPLINK RESOURCES TO TERMINAL DEVICES WITH A SIMILAR TRAFFIC PROFILE

CROSS-REFERENCE TO RELATED APPLICATIONS

The present application is based on PCT/GB2013/052737 filed Oct. 21, 2013, and claims priority to British Patent Application 1222899.5, filed in the UK IPO on Dec. 19, 2012, the entire contents of each of which being incorporated herein by reference.

BACKGROUND OF THE INVENTION

The present invention relates to methods, systems and apparatus for use in wireless (mobile) telecommunications systems. In particular, embodiments of the invention relate to communicating uplink allocations of radio resources from a base station to a terminal device in such systems.

Third and fourth generation mobile telecommunication systems, such as those based on the 3GPP defined UMTS and Long Term Evolution (LTE) architectures, are able to support more sophisticated services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area needed of these networks, i.e. geographic locations where access to the networks is desired, is expected to increase rapidly.

The anticipated widespread deployment of third and fourth generation networks has led to the parallel development of devices and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server relating to the customer's consumption of a utility such as gas, water, electricity and so on. Further information on characteristics of MTC-type devices can be found, for example, in the corresponding standards, such as ETSI TS 122 368 V10.530 (2011-07)/3GPP TS 22.368 version 10.5.0 Release 10) [1]. Some typical characteristics of MTC type terminal devices/MTC type data might include, for example, characteristics such as low mobility, high delay tolerance, small data transmissions, a level of predictability for traffic usage and timing (i.e. traffic profile), relatively infrequent transmissions and group-based features, policing and addressing.

As a result of the increasing use of wireless telecommunications networks generally, and also the development of devices such as MTC devices with their potential for introducing large numbers of terminal devices into networks, there is a desire to provide for wireless telecommunications networks that can reliably support access by increasing numbers of devices. This desire to support more devices, however, gives rise to an increased potential for issues with network congestion and interference, particular in respect of the radio access interface. These issues may be particularly relevant in respect of those communications which are not centrally managed by a scheduler in a communication cell of a network, such as random access communications from terminal devices seeking to access the network before having been allocated dedicated radio resources for doing so.

There is therefore a desire to provide for telecommunications apparatus and methods which can help reduce the potential for radio network congestion and interference in circumstances where there might be relatively large numbers of terminal devices seeking access to the network.

SUMMARY OF THE INVENTION

According to a first aspect of the invention there is provided a method of operating a base station for allocating radio resources for uplink transmissions in a wireless telecommunications system, the method comprising: receiving a request for an allocation of radio resources from a first terminal device; determining an association between the first terminal device and a second terminal device; and transmitting a radio resource allocation message to allocate radio resources to the second terminal device for an uplink transmission in response to receiving the request for an allocation of radio resources from the first terminal device.

In accordance with some embodiments the request for an allocation of radio resources from the first terminal device is received on a random access channel of the wireless telecommunications system.

In accordance with some embodiments the request for an allocation of radio resources from the first terminal device is associated with a random access procedure of the wireless telecommunications system.

In accordance with some embodiments the radio resources allocated to the second terminal device correspond with an allocation of radio resources requested by the first terminal device.

In accordance with some embodiments the association between the first terminal device and the second terminal device is established based on the first terminal device and the second terminal device having a common characteristic relating to their uplink transmissions.

In accordance with some embodiments the association between the first terminal device and the second terminal device is established based on the first terminal device and the second terminal device being associated with a same terminal device classifier.

In accordance with some embodiments the terminal device classifier is a quality class indicator of respective bearers associated with the respective terminal devices.

In accordance with some embodiments the method further comprises transmitting an access request denial message to the second terminal device to instruct the second terminal device not to make its own request for an allocation of radio resources.

In accordance with some embodiments the method further comprises transmitting a cease access request denial message to the second terminal device after having transmitted the access request denial message to instruct the second terminal device that it is now allowed to make its own request for an allocation of radio resources.

In accordance with some embodiments the method further comprises transmitting an access request allow message to the first terminal device to instruct the first terminal device that it is allowed to make the request for the allocation of radio resources.

In accordance with some embodiments the method further comprises selecting the first terminal device from a plurality of terminal devices as the terminal device to which the access request allow message is transmitted based on a transmission characteristic associated with respective ones of the plurality of terminal devices.

In accordance with some embodiments the transmission characteristic is selected from the group comprising: a timing advance; a reference signal received power, a reference signal received quality, a sounding reference signal measurement at the base station, and a radio channel quality indicator.

In accordance with some embodiments the method further comprises determining an association between the first terminal device and a further terminal device; and transmitting a radio resource allocation message to the further terminal device to allocate radio resources for an uplink transmission from the further terminal device based on the request for an allocation of radio resources from the first terminal device.

In accordance with some embodiments the method further comprises determining an association between the first terminal device and a plurality of other terminal devices, transmitting an access request denial message to a subset of the plurality of other terminal devices to instruct the subset of the plurality of other terminal devices not to make their own requests for an allocation of radio resources, and transmitting radio resource allocation messages to the plurality of other terminal devices to allocate radio resources for respective uplink transmissions from respective ones of the plurality of other terminal devices based on the request for an allocation of radio resources from the first terminal device.

In accordance with some embodiments the method further comprises receiving a transmission from the second terminal device using the radio resources allocated to the second terminal device.

In accordance with some embodiments the transmission received from the second terminal device comprises an indication that the second terminal device does not require some or any of the allocated resources for uplink transmission.

In accordance with some embodiments the transmission received from the second terminal device comprises an indication of a request for a further allocation of radio resources for a further uplink transmission from the second terminal device.

In accordance with some embodiments the request for an allocation of radio resources received from the first terminal device comprises a request for an allocation of radio resources to allow the first terminal device to transmit a buffer status report to the base station.

In accordance with some embodiments the first and second terminal devices are machine type communication, MTC, terminal devices.

In accordance with some embodiments the wireless telecommunications system is associated with a radio interface spanning a system frequency bandwidth for supporting radio communications with a first type of terminal device and comprising a restricted frequency bandwidth for supporting radio communications with a second type of terminal device, wherein the restricted frequency bandwidth is narrower than and within the system frequency bandwidth, and wherein the first and second terminal devices are terminal devices of the second type.

In accordance with a second aspect of the invention there is provided a base station configured to allocate radio resources for uplink transmissions in a wireless telecommunications system, the base station comprising: transceiver configured to receive a request for an allocation of radio resources from a first terminal device; and a controller unit configured to determine an association between the first terminal device and a second terminal device and to control the transceiver to transmit a radio resource allocation message to allocate radio resources to the second terminal device for an uplink transmission in response to receiving the request for an allocation of radio resources from the first terminal device.

In accordance with some embodiments the base station is configured such that the request for an allocation of radio resources from the first terminal device is received on a random access channel of the wireless telecommunications system.

In accordance with some embodiments the base station is configured such that the request for an allocation of radio resources from the first terminal device is associated with a random access procedure of the wireless telecommunications system.

In accordance with some embodiments the base station is configured such that the radio resources allocated to the second terminal device correspond with an allocation of radio resources requested by the first terminal device.

In accordance with some embodiments the base station is configured such that the association between the first terminal device and the second terminal device is established based on the first terminal device and the second terminal device having a common characteristic relating to their uplink transmissions.

In accordance with some embodiments the base station is configured such that the association between the first terminal device and the second terminal device is established based on the first terminal device and the second terminal device being associated with a same terminal device classifier.

In accordance with some embodiments the base station is configured such that the terminal device classifier is a quality class indicator of respective bearers associated with the respective terminal devices.

In accordance with some embodiments the controller unit is further configured to control the transceiver to transmit an access request denial message to the second terminal device to instruct the second terminal device not to make its own request for an allocation of radio resources.

In accordance with some embodiments the controller unit is further configured to control the transceiver to transmit a cease access request denial message to the second terminal device after having transmitted the access request denial message to instruct the second terminal device that it is now allowed to make its own request for an allocation of radio resources.

In accordance with some embodiments the controller unit is further configured to control the transceiver to transmit an access request allow message to the first terminal device to instruct the first terminal device that it is allowed to make the request for the allocation of radio resources.

In accordance with some embodiments the controller unit is further configured to select the first terminal device from a plurality of terminal devices as the terminal device to which the access request allow message is transmitted based on a transmission characteristic associated with respective ones of the plurality of terminal devices.

In accordance with some embodiments the transmission characteristic is selected from the group comprising: a timing advance; a reference signal received power, a reference signal received quality, a sounding reference signal measurement at the base station, and a radio channel quality indicator.

In accordance with some embodiments the controller unit is further configured to determine an association between the first terminal device and a further terminal device; and to cause the transceiver to transmit a radio resource allocation message to the further terminal device to allocate radio resources for an uplink transmission from the further terminal device based on the request for an allocation of radio resources from the first terminal device.

In accordance with some embodiments the controller unit is further configured to determine an association between the first terminal device and a plurality of other terminal devices and to control the transceiver to transmit an access request denial message to a subset of the plurality of other terminal devices to instruct the subset of the plurality of other terminal devices not to make their own requests for an allocation of radio resources and to further transmit radio resource allocation messages to the plurality of other terminal devices to allocate radio resources for respective uplink transmissions from respective ones of the plurality of other terminal devices based on the request for an allocation of radio resources from the first terminal device.

In accordance with some embodiments the transceiver is further configured to receive a transmission from the second terminal device using the radio resources allocated to the second terminal device.

In accordance with some embodiments the transmission received from the second terminal device comprises an indication that the second terminal device does not require some or any of the allocated resources for uplink transmission.

In accordance with some embodiments the transmission received from the second terminal device comprises an indication of a request for a further allocation of radio resources for a further uplink transmission from the second terminal device.

In accordance with some embodiments the request for an allocation of radio resources received from the first terminal device comprises a request for an allocation of radio resources to allow the first terminal device to transmit a buffer status report to the base station.

In accordance with some embodiments the first and second terminal devices are machine type communication, MTC, terminal devices.

In accordance with some embodiments the wireless telecommunications system is associated with a radio interface spanning a system frequency bandwidth for supporting radio communications with a first type of terminal device and comprising a restricted frequency bandwidth for supporting radio communications with a second type of terminal device, wherein the restricted frequency bandwidth is narrower than and within the system frequency bandwidth, and wherein the first and second terminal devices are terminal devices of the second type.

According to a third aspect of the invention there is provided a wireless telecommunications system comprising the base station of the second aspect of the invention and a terminal device.

According to a fourth aspect of the invention there is provided a method of operating a terminal device for receiving an allocation of radio resources for transmission of uplink data to a base station in a wireless telecommunications system, the method comprising: determining that the terminal device has uplink data waiting for transmission to the base station; determining that the terminal device should not transmit a request for an allocation of radio resources for transmission of the uplink data to the base station, and waiting to receive a radio resource allocation message from the base station to allocate radio resources to be used for transmissions associated with the uplink data waiting for transmission to the base station.

In accordance with some embodiments determining that the terminal device should not transmit a request for an allocation of radio resources comprises determining that the terminal device should not initiate a random access procedure of the wireless telecommunications system.

In accordance with some embodiments determining that the terminal device should not initiate a random access procedure of the wireless telecommunications system comprises determining that the terminal device should not make transmissions on a physical random access channel of the wireless telecommunications system.

In accordance with some embodiments determining that the terminal device should not transmit a request for an allocation of radio resources is based on the terminal device receiving an indication that the terminal device should not transmit a request for an allocation of radio resources.

In accordance with some embodiments the indication comprises an indication that another terminal device in the wireless telecommunications system has made a request for an allocation of radio resources.

In accordance with some embodiments determining that the terminal device should not transmit a request for an allocation of radio resources is based on the terminal device having received an access request denial message from the base station.

In accordance with some embodiments the method further comprises subsequently receiving the radio resource allocation message from the base station.

In accordance with some embodiments the method further comprises transmitting the uplink data waiting for transmission to the base station using radio resources derived from information in the radio resource allocation message received from the base station.

In accordance with some embodiments the method further comprises determining at a later time after having transmitted the uplink data to the base station that the terminal device has further uplink data waiting for transmission to the base station, and, in response thereto, determining that the terminal device should transmit a request for an allocation of radio resources on which to transmit the uplink data to the base station, and transmitting such a request.

In accordance with some embodiments determining that the terminal device should transmit a request for an allocation of radio resources in response to determining that the terminal device has further uplink data waiting for transmission to the base station is based on the terminal device having received an access request allow message from the base station to indicate the terminal device is allowed to make a request for an allocation of radio resources.

In accordance with some embodiments the method further comprises determining that the allocation of radio resources is not sufficient for the uplink data waiting for transmission to the base station and transmitting to the base station an indication of a request for a further allocation of radio resources in response thereto.

In accordance with some embodiments the indication of a request for a further allocation of radio resources is transmitted to the base station using the allocated radio resources.

In accordance with some embodiments the method further comprises transmitting a request for an allocation of radio resources on which to transmit the uplink data to the base station after waiting to receive a radio resource allocation message from the base station for a period of time without a radio resource allocation message being received from the base station.

In accordance with some embodiments the terminal device is a machine type communication, MTC, terminal device.

In accordance with some embodiments the wireless telecommunications system is associated with a radio interface spanning a system frequency bandwidth for supporting radio communications with a first type of terminal device and comprising a restricted frequency bandwidth for supporting radio communications with a second type of terminal device, wherein the restricted frequency bandwidth is narrower than and within the system frequency bandwidth, and wherein the terminal device is a terminal device of the second type.

According to a fifth aspect of the invention there is provided a terminal device arranged to receive an allocation of radio resources for transmission of uplink data to a base station in a wireless telecommunications system, wherein the terminal device is configured to: determine that the terminal device has uplink data waiting for transmission to the base station; determine that the terminal device should not transmit a request for an allocation of radio resources for transmission of the uplink data to the base station, and wait to receive a radio resource allocation message from the base station to allocate radio resources to be used for transmissions associated with the uplink data waiting for transmission to the base station.

In accordance with some embodiments the terminal device is configured such that determining that the terminal device should not transmit a request for an allocation of radio resources comprises determining that the terminal device should not initiate a random access procedure of the wireless telecommunications system.

In accordance with some embodiments the terminal device is configured such that determining that the terminal device should not initiate a random access procedure of the wireless telecommunications system comprises determining that the terminal device should not make transmissions on a physical random access channel of the wireless telecommunications system.

In accordance with some embodiments the terminal device is configured such that determining that the terminal device should not transmit a request for an allocation of radio resources is based on the terminal device receiving an indication that the terminal device should not transmit a request for an allocation of radio resources.

In accordance with some embodiments the indication comprises an indication that another terminal device in the wireless telecommunications system has made a request for an allocation of radio resources.

In accordance with some embodiments the terminal device is configured such that determining that the terminal device should not transmit a request for an allocation of radio resources is based on the terminal device having received an access request denial message from the base station.

In accordance with some embodiments the terminal device is further configured to subsequently receive the radio resource allocation message from the base station.

In accordance with some embodiments the terminal device is further configured to transmit the uplink data waiting for transmission to the base station using radio resources derived from information in the radio resource allocation message received from the base station.

In accordance with some embodiments the terminal device is further configured to determine at a later time after having transmitted the uplink data to the base station that the terminal device has further uplink data waiting for transmission to the base station, and, in response thereto, to determine that the terminal device should transmit a request for an allocation of radio resources on which to transmit the uplink data to the base station, and to transmit such a request.

In accordance with some embodiments the terminal device is configured such that determining that the terminal device should transmit a request for an allocation of radio resources in response to determining that the terminal device has further uplink data waiting for transmission to the base station is based on the terminal device having received an access request allow message from the base station to indicate the terminal device is allowed to make a request for an allocation of radio resources.

In accordance with some embodiments the terminal device is further configured to determine that the allocation of radio resources is not sufficient for the uplink data waiting for transmission to the base station and to transmit to the base station an indication of a request for a further allocation of radio resources in response thereto.

In accordance with some embodiments the terminal device is configured such that the indication of a request for a further allocation of radio resources is transmitted to the base station using the allocated radio resources.

In accordance with some embodiments the terminal device is further configured to transmit a request for an allocation of radio resources on which to transmit the uplink data to the base station after waiting to receive a radio resource allocation message from the base station for a period of time without a radio resource allocation message being received from the base station.

In accordance with some embodiments the terminal device is a machine type communication, MTC, terminal device.

In accordance with some embodiments the wireless telecommunications system is associated with a radio interface spanning a system frequency bandwidth for supporting radio communications with a first type of terminal device and comprising a restricted frequency bandwidth for supporting radio communications with a second type of terminal device, wherein the restricted frequency bandwidth is narrower than and within the system frequency bandwidth, and wherein the terminal device is a terminal device of the second type.

According to a sixth aspect of the invention there is provided a wireless telecommunications system comprising the terminal device of the fifth aspect of the invention and a base station.

It will be appreciated that features and aspects of the invention described above in relation to the first and other aspects of the invention are equally applicable to, and may be combined with, embodiments of the invention according to other aspects of the invention as appropriate, and not just in the specific combinations described above.

BRIEF DESCRIPTION OF DRAWINGS

Embodiments of the present invention will now be described by way of example only with reference to the accompanying drawings where like parts are provided with corresponding reference numerals and in which:

FIG. 2 schematically represents a conventional random access procedure in a LTE-type wireless telecommunication network;

FIG. 3 schematically represents some aspects of a conventional uplink radio frame structure in a LTE-type wireless telecommunication network;

FIG. 4 shows a table summarizing four potential formats in which a terminal device may transmit a random access preamble in accordance with a LTE-based network operating in a frequency division duplex (FDD) mode;

DESCRIPTION OF EXAMPLE EMBODIMENTS

Figure 1:
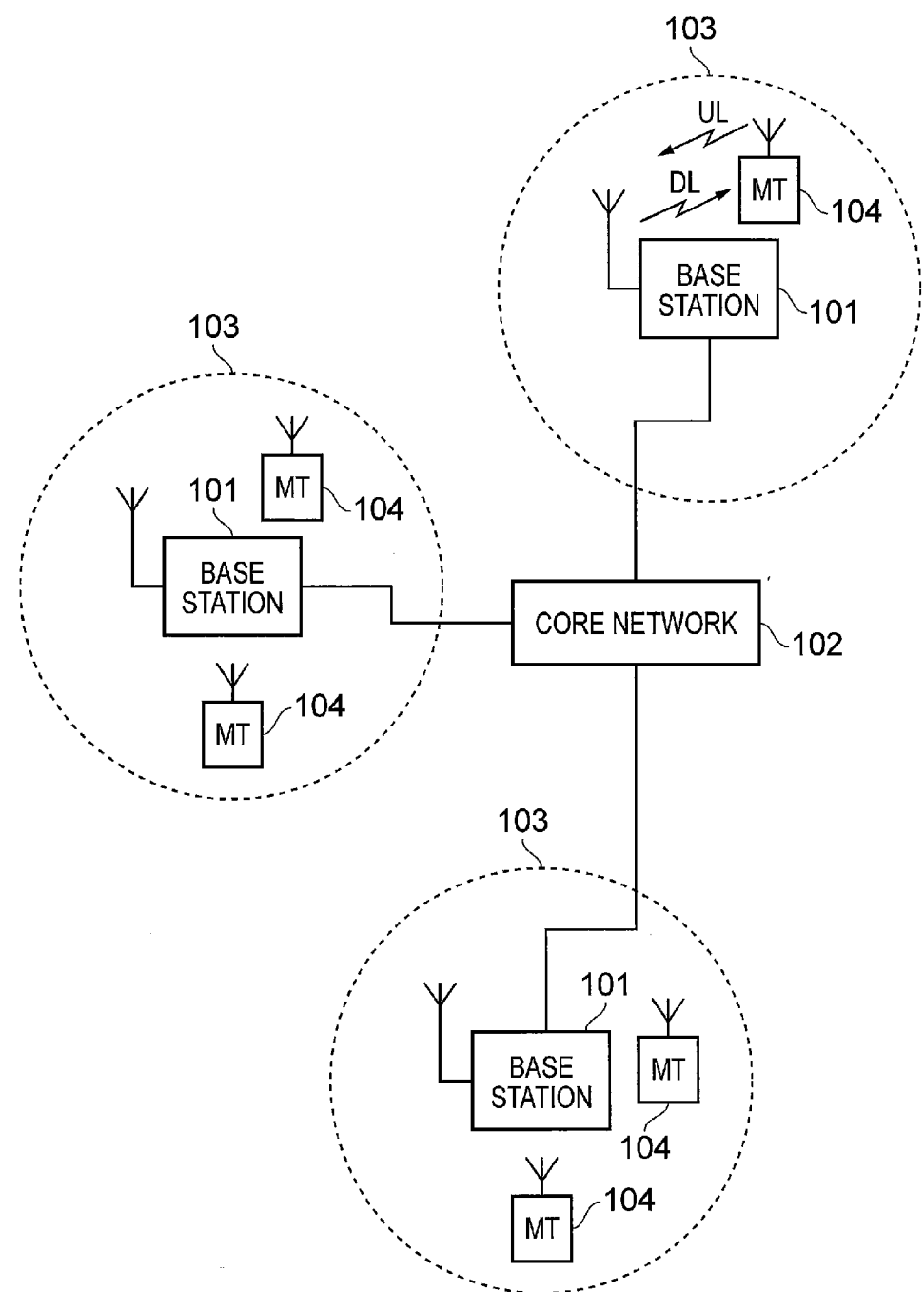
FIG. 1 schematically represents an example of a conventional LTE-type wireless telecommunication network.

FIG. 1 provides a schematic diagram illustrating some basic functionality of a wireless telecommunications network/system 100 operating in accordance with LTE principles. Various elements of FIG. 1 and their respective modes of operation are well-known and defined in the relevant standards administered by the 3GPP® body and also described in many books on the subject, for example, Holma H. and Toskala A [2]. The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The radio downlink and radio uplink may together be considered to support the radio interface for the wireless telecommunications system. The core network 102 routes data between the respective base stations 101 and provides functions such as authentication, mobility management, charging and so on. As is well understood, terminal devices may also be referred to as mobile stations, user equipment (UE), user terminal, mobile radio, and so forth, and base stations may also be referred to as transceiver stations/nodeBs/e-NodeBs/eNBs, and so forth.

In LTE-type networks scheduling decisions for both uplink (UL) and downlink (DL) transmissions are governed by a scheduler in the base station (eNodeB/eNB). For downlink, clearly the base station knows how much data is ready to be delivered to each terminal device. However, for uplink the base station is generally not initially aware of how much data needs to be communicated (and hence does not know how much radio resource needs to be allocated) because the data is buffered at the respective terminal devices. Consequently, in accordance with established LTE principles, terminal device are configured to communicate to their serving base station information regarding their buffer status (i.e. how much data the respective terminal devices have ready for uplink communication). This information is conventionally sent in a so-called Buffer Status Report (BSR) on an uplink shared channel (UL-SCH) which is physically transmitted on a physical uplink shared channel (PUSCH). Further information on BSRs can be found with reference to the relevant standards. See, for example, ETSI TS 136 321 V10.6.0 (2012-10)/3GPP TS 36.321 version 10.6.0 Release 10 [3]

A BSR in a conventional LTE network is 6 bits long and a terminal device may send either one or four such BSRs at a time, reporting the number of bytes of data in either one group of logical channels or four groups of logical channels respectively. The 6 bits are quantized in the relevant specifications/standards to allow a terminal device to report buffer levels of between 0 and 150,000 bytes, or in the case of an extended BSR, between 0 and 3,000,000 bytes. A terminal device will have a Radio Resource Control (RRC) configuration determining whether it should send ordinary or extended BSRs.

A BSR can be Regular, Periodic or Padding.

A terminal device sends a Regular BSR when:

a) Data arrives for a logical channel which has higher priority than the logical channels whose buffers previously contained data;

b) Data becomes available for any logical channel when there was previously no data available for transmission;

c) A 'retxBSR' timer expires and there is data available for transmission.

The retxBSR timer is used to alleviate the situation where the base station fails to receive BSR correctly but for some reason is not able successfully to inform the terminal device of this (perhaps because the BSR NACK is incorrectly decoded as ACK at the terminal device). Therefore, the retxBSR timer is reset each time an UL grant is received and BSR is transmitted when the timer expires.

A Periodic BSR is sent when a periodic BSR timer expires and is used by RRC to control BSR reporting.

A Padding BSR is sent when there is space available in a Medium Access Control Protocol Data Unit (MAC PDU) that can accommodate a BSR.

In accordance with conventional LTE principles, if a terminal device does not have a sufficient allocation of PUSCH resource to send a Regular BSR, it will instead attempt to send a one-bit Scheduling Request (SR) on a physical uplink control channel (PUCCH) in resources which can be allocated by RRC. If the terminal device does not have such an allocation, it will initiate a Random Access (RA) procedure in which it sends a SR to request an uplink (UL) grant of resources on PUSCH which are sufficient to send the BSR. Periodic and Padding BSR do not trigger SR (or RA).

Random Access procedures in LTE-based networks can be contention based or non-contention based. A contention based RA procedure is triggered when a terminal device needing to send a BSR does not have a sufficient allocation of PUSCH resource to do so or any SR allocation on PUCCH. Random Access procedures generally involve accessing a random access transport channel (RACH in LTE terminology) with transmissions on an associated physical random access channel (PRACH in LTE terminology).

To access RACH in a LTE-type network, a terminal device transmits a sequence, known as a preamble, using defined radio resources within the network's uplink radio frame structure (time-frequency resource grid). The base station is configured to monitor the defined resources for any of the preambles that a terminal device in the cell might transmit, and, on detecting such a preamble, responds in accordance with the defined RA procedure, which is summarized further below. In total, 838 preambles are defined in LTE, but currently a network operator configures each communication cell with only 64 preambles according to the characteristics of the cell. The preambles and the uplink resources for transmission of the preambles available for use in a particular communication cell are broadcast by the base station to the terminal devices with System Information Block (SIB) signalling, in particular, using SIB2.

FIG. 2 is a ladder diagram schematically showing steps of a conventional LTE contention-based random access procedure in which a terminal device 104 (left-hand node in FIG. 2) seeks to access to a base station 101 (right-hand node in FIG. 2). For more details on LTE RA procedures see, for example, ETSI TS 136 300 V10.8.0 (2012-07)/3GPP TS 36.300 version 10.8.0 Release 10 [4].

The steps of the contention-based RA procedure may be summarized as follows:

Step 1. The terminal device 104 transmits a preamble from among the set configured for contention based RA in the communication cell served by the base station 101. Based on the radio resources used for the transmission the terminal device determines a RA-RNTI (Random Access Radio Network Temporary Identity) associated with the transmission.

Step 2. The base station 101 sends a Random Access Response (RAR) addressed to RA-RNTI and containing the identity of the detected preamble, a timing alignment command and a temporary C-RNTI (Cell Radio Network Temporary Identity).

Step 3. Assuming the terminal device receives the RAR from the base station within a specified time window after preamble transmission in Step 1, the terminal device transmits a so-called Message 3, which contains the appropriate RA procedure message. For example, the RA procedure message might be a scheduling request, a tracking area update or a RRC connection request.

Step 4. On receiving Message 3 from Step 3, the base station sends a contention resolution message. The terminal device to which this message is addressed will transmit ACK/NACK response signalling in association with the defined HARQ (Hybrid Automatic Repeat request) procedures. Other contending terminal devices which successfully decode the message as a result of contention transmit no HARQ feedback and exit the RA procedure.

The physical transmissions associated with the RA procedure in LTE-based networks are carried on PRACH. This physical channel occupies a bandwidth of 1.08 MHz (falling within the width of 6 Resource blocks (RBs)) in the frequency domain and, unlike other aspects of LTE channels, employs a 1.25 kHz subcarrier spacing. The subframes of the uplink radio frame structure in which terminal devices are permitted to transmit PRACH are configurable per-cell by the network operator. PRACH is time- and frequency-multiplexed with PUSCH and PUCCH as schematically indicated in FIG. 3.

FIG. 3 represents a time-frequency resource grid for a LTE-based uplink frame structure with a schematic indication of how PUSCH, PUCCH and PRACH are multiplexed. As can be seen from FIG. 3, PUCCH is associated with frequency resources towards the upper and lower edges of the system bandwidth; PUSCH is associated with frequency resources between the PUCCH regions; and PRACH is associated with discrete regions of resources within the PUSCH regions. The respective regions of time and frequency resources associated with PRACH occur once every PRACH slot period, and as noted above, have a bandwidth corresponding to 6RBs. Whether PUSCH transmissions occur in PRACH slots is a matter for the base station scheduler.

FIG. 4 is a table that summarizes the four potential formats in which a terminal device may transmit a RA preamble in Step 1 of FIG. 2 in accordance with a LTE-based network operating in a frequency division duplex (FDD) mode. The left-most column ("Preamble format") lists the four potential preamble formats. The next column ("$T_{CP}$") lists the corresponding cyclic prefix duration in microseconds. The next column ("$T_{SEQ}$") lists the corresponding preamble sequence duration in microseconds. The next column ("$T_{GT}$") lists the corresponding guard time in microseconds. The right-most column ("PRACH slot duration") lists the corresponding duration of each PRACH slot in subframes.

A significant aspect of PRACH in LTE-type networks is that resources for PRACH transmissions extend for at least one subframe, and potentially longer for preamble formats 1 to 3, and occur at the same time as PUSCH and PUCCH transmissions. This means PRACH is a potential source of interference for PUSCH and PUCCH during times of overlapping transmissions. In accordance with some embodiments of the invention the potential for interference caused by PRACH transmissions may be reduced by providing for modified random access procedures as discussed further below.

Interference associated with random access procedure transmissions can occur regardless of a wireless telecommunication's system bandwidth, but the issue can be expected to be relatively more significant in situations involving relatively narrow bandwidths. This is because the bandwidth of the PRACH channel can becomes a relatively larger part of the overall system bandwidth. In this respect, one area where PRACH transmissions could represent a particularly significant interference issue is in the use of the so-called virtual carrier networks, for example as discussed in co-pending UK patent applications numbered GB 1101970.0 [5], GB 1101981.7 [6], GB 1101966.8 [7], GB 1101983.3 [8], GB 1101853.8 [9], GB 1101982.5 [10], GB 1101980.9 [11], GB 1101972.6 [12], GB 1121767.6 [13] and GB 1121766.8 [14]. More information on virtual carriers can be found from these documents, but by way of a general overview, the concept underlying the virtual-carrier ideas is the use of a relatively narrow band of frequencies from within a wider host carrier bandwidth to support terminal devices operating within the narrower band. Thus, the narrower band within the host carrier may in some respects be considered as a separate carrier for supporting certain devices (i.e. virtual carrier).

As noted above, certain classes of devices, such as MTC devices, support communication applications that can often be characterised by the transmission of small amounts of data at relatively infrequent intervals, and can thus operate with considerably less complexity than conventional LTE terminals. In many scenarios, providing low capability terminals such as those with a conventional high-performance LTE receiver unit capable of operating over a full system bandwidth can be overly complex for a device which only needs to communicate small amounts of data. This may therefore limit the practicality of a widespread deployment of low capability MTC type devices in a LTE network if the devices are required to support relatively complex transceivers. It is preferable instead to provide low capability terminals such as MTC devices with a simpler transceiver unit which is more proportionate with the amount of data likely to be transmitted to the terminal. In this regard, the provision of a relatively narrow band "virtual carrier" within the transmission resources of a conventional OFDM type downlink carrier (i.e. a "host carrier") can allow devices with simpler transceivers to be accommodated. This is because data communicated on the virtual carrier can be received and decoded without needing to process the full bandwidth of the downlink host OFDM carrier. Accordingly, data communicated on the virtual carrier can be received and decoded using a reduced complexity transceiver unit, which, as noted above, is attractive for MTC type devices.

One proposed bandwidth for virtual carrier operation is 1.4 MHz and this corresponds with the bandwidth for PRACH. Accordingly, it may be the case in a virtual carrier context that PRACH transmissions span, and hence potentially interfere with, the full bandwidth for PUSCH transmissions on the virtual carrier, possibly for up to 3 subframes (depending on preamble format), when a terminal device initiates a RA procedure. The PRACH transmissions may also interfere with PUCCH depending on scheduling.

Accordingly, it is expected that narrow bandwidth carriers, such as virtual carriers operating within a wider bandwidth host carrier, may be most affected by PRACH transmissions associated with random access procedures resulting in a degradation in performance for PUSCH and PUCCH transmissions. Such a degradation in performance can be expected to result in increased need for retransmissions from terminal devices, thereby causing still further congestion and interference on the radio network, and consuming terminal device power reserves more quickly. Furthermore, as noted above, for MTC-type devices, where terminal devices may be more densely deployed, such PRACH to PUSCH/PUCCH interference could arise even more frequently as a result of the terminal device density. Such MTC devices are designed to be low cost and may have limited battery life and transmit power, and be installed in inaccessible locations, and so it can be particularly desirable to minimize the need to retransmit PUSCH/PUCCH due to PRACH interference in respect of MTC-devices, and furthermore in respect of MTC-type devices operating on relatively narrow bandwidths, such as in a virtual carrier context. Nonetheless, it will be appreciated that PRACH to PUSCH/PUCCH interference issues can equally arise for more conventional types of terminal device operating on wider bandwidths.

In addition to radio network interference, in situations where there is the potential for relatively large numbers of terminal devices to seek to access a network through random access procedures the limited number of available RA preambles may become an issue. This is because with more terminal devices seeking access around the same time there is an increased likelihood of two terminal devices choosing the same RA preamble and causing a collision on RACH. Such collisions also result in PRACH retransmissions from at least one of the colliding terminal devices, thereby causing more radio network interference and consuming additional power for the terminal device.

With these issues in mind, certain embodiments of the invention are directed to schemes for controlling random access procedures for a plurality of terminal devices in a wireless telecommunications network with a view to reducing the overall number of PRACH transmissions occurring. In some examples this is achieved by a base station allocating uplink resources to one terminal device in response to a random access procedure initiated by another, different, terminal device. Correspondingly, in accordance with some embodiments a terminal device may receive an allocation of resources as a consequence of another terminal device initiating a random access procedure.

Figure 5:
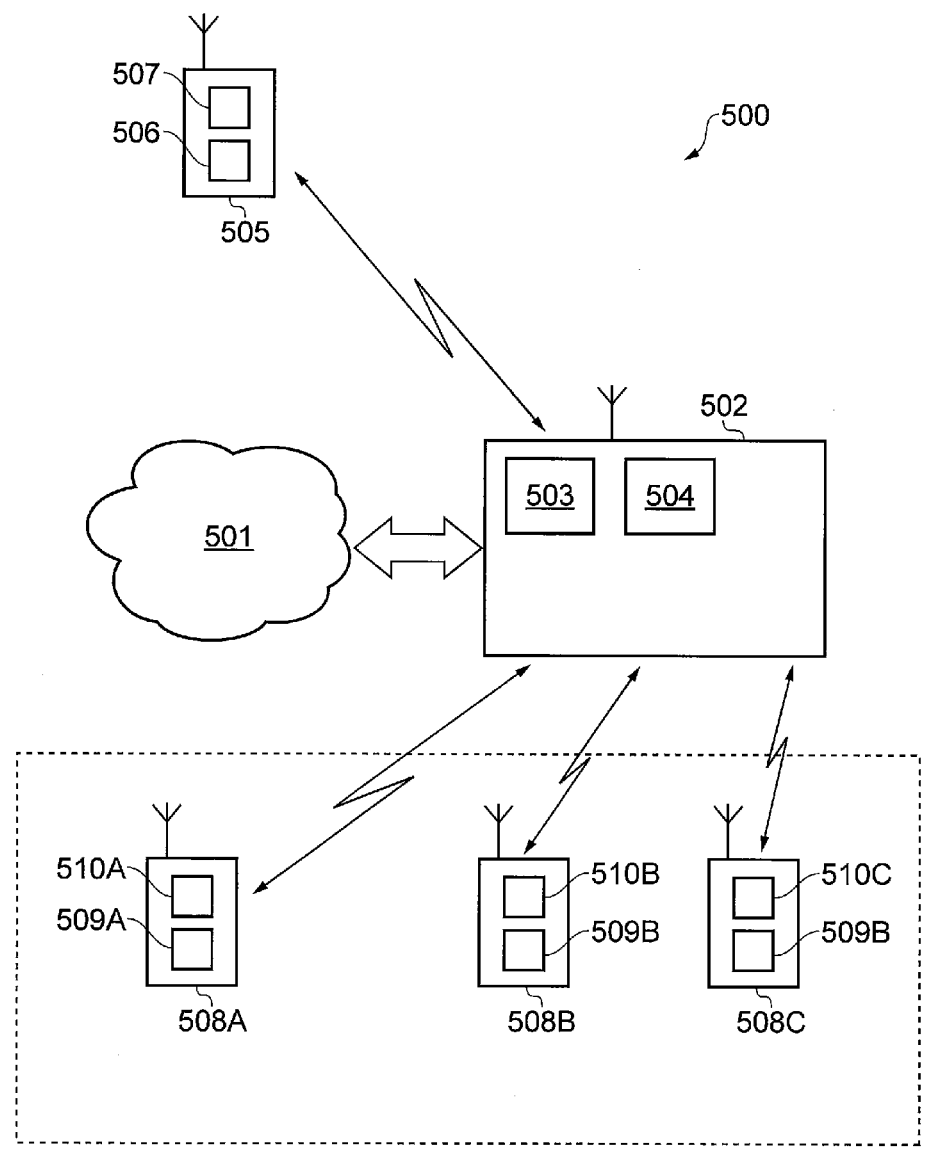
FIG. 5 schematically represents an example of a LTE-type wireless telecommunication network according to an embodiment of the invention.

FIG. 5 schematically shows a telecommunications system 500 according to an embodiment of the invention. The telecommunications system 500 in this example is based broadly on a LTE-type architecture. As such many aspects of the operation of the telecommunications system 500 are known and understood and are not described here in detail in the interest of brevity. Operational aspects of the telecommunications system 500 which are not specifically described herein may be implemented in accordance with known techniques, for example according to the established and published LTE-standards.

The telecommunications system 500 comprises a core network part (evolved packet core) 501 coupled to a radio network part. The radio network part comprises a base station (evolved-NodeB/eNB) 502 adapted in accordance with an embodiment of the invention and arranged to communicate with a plurality of terminal devices. In this example, four terminal devices are shown, namely a terminal device 505 of a first type and three terminal devices 508A, 508B, 508C of a second type. Where it is not significant to distinguish between the three terminal devices 508A, 508B, 508C of the second type, these terminal devices may be referred to collectively as terminal devices 508. It will of course be appreciated that in practice the radio network part may comprise a plurality of base stations serving a larger number of terminal devices across various communication cells. However, only a single base station and four terminal devices are shown in FIG. 5 in the interests of simplicity.

As with a conventional mobile radio network, the terminal devices 505, 508 are arranged to communicate data to and from the base station (transceiver station) 502. The base station is in turn communicatively connected to a serving gateway, S-GW, (not shown) in the core network part which is arranged to perform routing and management of mobile communications services to the terminal devices in the telecommunications system 500 via the base station 502. In order to maintain mobility management and connectivity, the core network part 501 also includes a mobility management entity (not shown) which manages the enhanced packet service, EPS, connections with the terminal devices 505, 508 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 501 to an external packet data network, for example the Internet. As noted above, the operation of the various elements of the communications system 500 shown in FIG. 5 may be broadly conventional apart from where modified to provide functionality in accordance with embodiments of the invention as discussed herein.

In this example, it is assumed the first terminal device 505 is a conventional smart-phone type terminal device communicating with the base station 502 in a conventional manner. This first terminal device 505 comprises a transceiver unit 507 for transmission and reception of wireless signals and a controller unit 506 configured to control the smart phone 505. The controller unit 506 may comprise a processor unit which is suitably configured/programmed to provide the desired functionality using conventional programming/configuration techniques for equipment in wireless telecommunications systems. The transceiver unit 507 and the controller unit 506 are schematically shown in FIG. 5 as separate elements. However, it will be appreciated that the functionality of these units can be provided in various different ways, for example using a single suitably programmed integrated circuit. As will be appreciated the smart phone 505 will in general comprise various other elements associated with its operating functionality.

In this example, it is assumed the terminal devices 508 the second type are all machine-type communication (MTC) terminal devices. As discussed above, these types of device may be typically characterised as semi-autonomous or autonomous wireless communication devices communicating small amounts of data. Examples include so-called smart meters which may be located in a customer's house and periodically transmit information back to a central MTC server data relating to the customer's consumption of a utility, such as gas, water, electricity and so on.

As with the smart phone 505, the respective MTC devices 508A, 508B, 508C each comprise a transceiver unit 510A, 510B, 510C for transmission and reception of wireless signals and a controller unit 509A, 509B, 509C configured to control the respective devices 508A, 508B, 508C. The controller units 509A, 509B, 509C may each comprise various sub-units for providing functionality in accordance with embodiments of the invention. For example, in accordance with some embodiments the respective terminal devices may comprise a data for uplink determining unit for determining the terminal device has uplink data waiting for transmission to the base station and a transmit request determining unit for determining the terminal device should not transmit a request for an allocation of radio resources for transmission of the uplink data to the base station and instead should wait to receive a radio resource allocation message from the base station configured to operate to provide functionality as described herein in accordance with embodiments of the invention. These sub-units may be implemented as discrete hardware elements or as appropriately configured functions of the controller unit. Thus the respective controller units 509A, 509B, 509C may comprise a processor unit which is suitably configured/programmed to provide the desired functionality described herein using conventional programming/configuration techniques for equipment in wireless telecommunications systems. The respective pairs of transceiver units 510A, 510B, 510C and controller units 509A, 509B, 509C for each device 508 are schematically shown in FIG. 5 as separate elements for ease of representation. However, it will be appreciated that within each device the functionality of these units can be provided in various different ways following established practices in the art, for example using a single suitably programmed integrated circuit. It will be appreciated the MTC devices 508 will in general comprise various other elements associated with their operating functionality and these other elements may generally operate in accordance with conventional techniques.

The base station 502 comprises a transceiver unit 503 for transmission and reception of wireless signals and a controller unit 504 configured to control the base station 502. The controller unit 504 may again comprise various sub-units for providing functionality in accordance with embodiments of the invention. For example, in accordance with some embodiments the base station may comprise: a request receiving unit for receiving a request for an allocation of radio resources from a first terminal device; an association determining unit for determining an association between the first terminal device and a second terminal device; and an allocation message transmitting unit for transmitting a radio resource allocation message to allocate radio resources to the second terminal device for an uplink transmission in response to receiving the request for an allocation of radio resources from the first terminal device configured to operate to provide functionality as described herein in accordance with embodiments of the invention. These sub-units may be implemented as discrete hardware elements or as appropriately configured functions of the controller unit/transceiver unit. Thus, the controller unit 504 may comprise a processor unit which is suitably configured/programmed to provide the desired functionality described herein using conventional programming/configuration techniques for equipment in wireless telecommunications systems. The transceiver unit 503 and the controller unit 504 are schematically shown in FIG. 5 as separate elements for ease of representation. However, it will be appreciated the functionality of these units can be provided in various different ways following established practices in the art, for example using a single suitably programmed integrated circuit. It will be appreciated the base station 502 will in general comprise various other elements associated with its operating functionality and these other elements may generally operate in accordance with conventional techniques.

It is assumed here the base station 502 is configured to communicate with the smart phone 505 in accordance with the established principles of LTE-based communications and to communicate with the terminal devices 508 in accordance with embodiments of the invention as described herein.

Certain embodiments of the invention are based on a recognition that certain types of terminal device in a wireless telecommunications network, such as the network 500 in FIG. 5, can be expected to have similar traffic profiles. For example, MTC-type terminal devices 508 associated with a given MTC application, such as smart metering on behalf of a particular gas supplier, might all be expected to be configured to uplink similar amounts of data at similar times, for example corresponding to a regular upload of information relating to a user's consumption of gas (or whatever it is that is being metered). In this regard, certain types of terminal device may be grouped according to their expected (or historically seen) traffic profiles. For example, the terminal devices might be grouped together based on an associated Quality of Service (QoS) Class Indicator (QCI) as specified in existing LTE standards (see, for example, ETSI TS 123 401 V10.8.0 (2012-07)/3GPP TS 23.401 version 10.8.0 Release 10 [15] and ETSI TS 123 203 V10.7.0 (2012-07)/ 3GPP TS 23.203 version 10.7.0 Release 10 [16]. In accordance with embodiments of the invention in which terminal devices are grouped based on QCI, it will be appreciated there may be some expansion of the currently specified QCI categories, for example to include categories relating to typical periodicity of uplink traffic, or burst parameters/statistics. Terminal devices may be grouped in other ways. For example, MTC devices associated with a common MTC application, for example smart metering on behalf of a particular gas supplier, may be considered to fall into a single traffic-profile group.

Thus, in accordance with an embodiment of the invention, a plurality of terminal devices may be notionally categorized as belonging to a particular group having some common characteristics associated with the uplink traffic profiles. With reference to FIG. 5, it is assumed in this example the three MTC-type terminal devices 508A, 508B, 508C are categorized as forming a group of terminal devices with similar uplink traffic profiles. As noted above, this might be because all three MTC terminal devices are associated with a given MTC application. In the following description of various modes of operation in accordance with some embodiments of the invention it will be assumed the MTC devices are in a RRC_Connected state.

In accordance with a first embodiment, it is assumed a base station maintains a record of the terminal devices in the same traffic profile group (for example based on a data record containing a list of identifiers for the respective terminal devices in the respective groups served by the base station). However, while the base station is aware of the relevant grouping information, in accordance with this example embodiment the individual terminal devices are not aware of the identities of other members of the group(s) to which they belong.

Referring again to FIG. 5, it is assumed that at some point in time terminal device 508A finds itself with some data in its uplink buffer. This might be because the terminal device is associated with a smart meter and it is time to upload information relating to usage according to its operating schedule. In accordance with the conventional principles of LTE operation, such as described above, the terminal device 508A seeks to transmit a BSR to the base station 502 to request an uplink allocation on PUSCH to uplink the data in its buffer in the normal way. However, again as described above, it may be that the terminal device has no current uplink grant on PUSCH on which to send a BSR and insufficient resources on PUCCH to send a SR. Accordingly, the terminal device will fall back to seek to access the network via RACH and the RA procedure. In this respect, the terminal device may follow conventional principles to arrive at the situation in which the RA procedure may be invoked in accordance with the conventional operating principles of the network in which this example embodiment is implemented.

Figure 6:
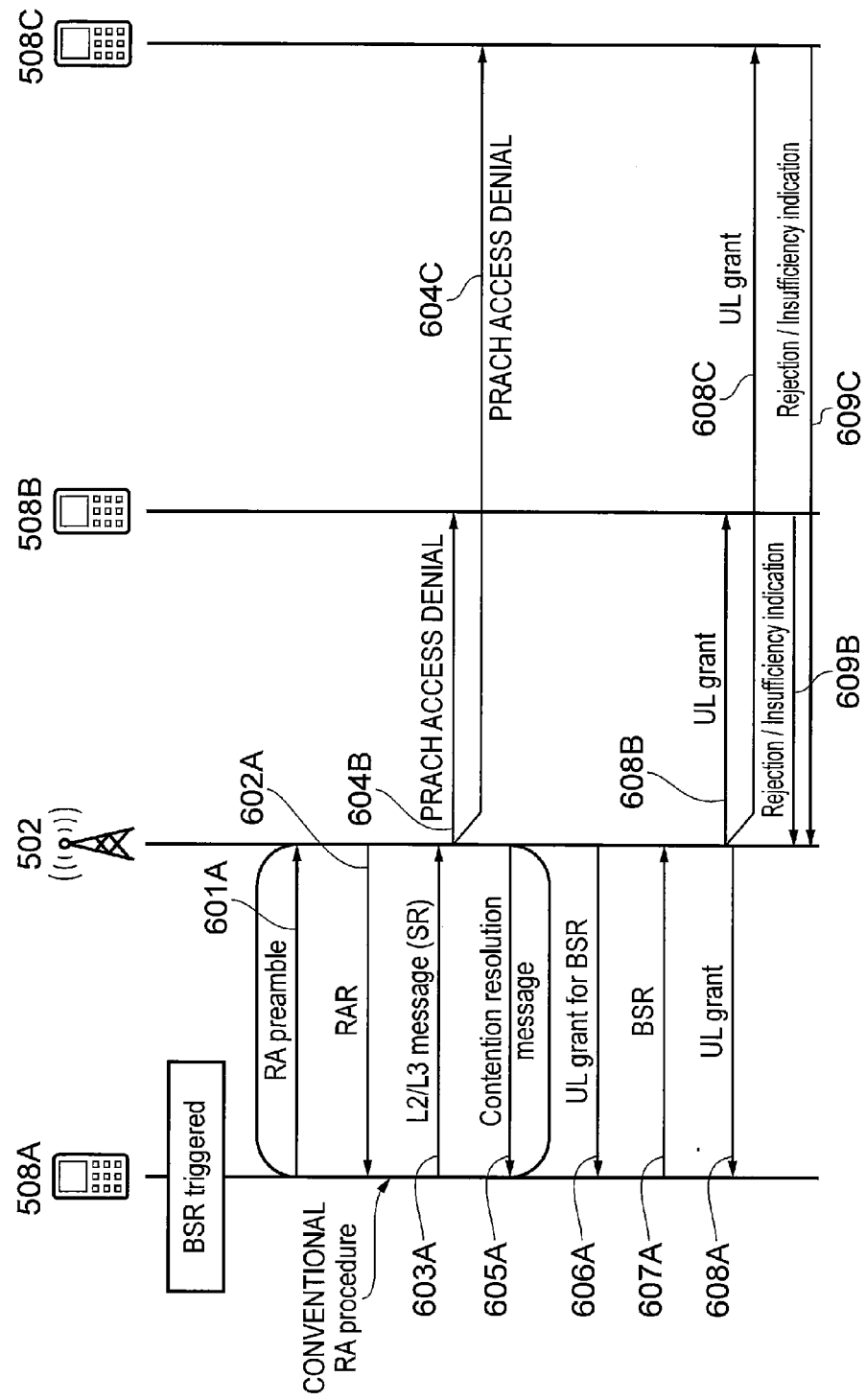
FIG. 6 schematically represents a scheme for allocating radio resources in a LTE-type wireless telecommunication network in accordance with an embodiment of the invention.

FIG. 6 is a ladder diagram schematically showing signalling among the base station 502 and terminal devices 508A, 508B, 508C in FIG. 5 in accordance with an embodiment of the invention. The signalling represented in FIG. 6 starts from a point at which terminal device 508A has reached a state in which a desire to send a BSR has caused terminal device 580A to initiate a RA procedure.

In accordance with this embodiment of the invention, the RA procedure in respect of terminal device 508A is configured to proceed as normal, for example as described above with reference to FIG. 2. Thus, in a first step the terminal device 508A sends a conventional RA preamble 601A to the base station 502 and, in a second step, the base station 502 responds by sending a conventional RAR 602A to the terminal device 508A. The terminal device 508A in turn transmits a Message 3 603A of the conventional RA procedure to the base station 502 in accordance with the principles discussed above with reference to FIG. 2.

At this stage of the process represented in FIG. 6 the base station 502 therefore receives signalling corresponding to Message 3 in the conventional RA procedure which indicates the terminal device 508A is transmitting a SR to request PUSCH resources to transmit a Regular BSR. In accordance with certain embodiments of the invention, the base station 502 is configured to determine whether or not the terminal device 508A that has initiated a RA procedure is a member of a defined traffic profile group. In this example this leads the base station to identify terminal devices 508B and 508C as being classified as having similar traffic profiles to terminal device 508A currently involved in the RA procedure. Because of their similar traffic profiles, it may be expected that, as with terminal device 508A, the terminal devices 508B and 508C will also be approaching a state in which they will wish to invoke their own RA procedures to request uplink resources to transmit their own BSRs. However, in accordance with some embodiments of the invention the base station 502 is configured to act to prevent terminal devices 508B, 508C from making such requests for uplink resources. This is done in this example by the base station 502 instructing the terminal devices 508B, 508C to not make any PRACH transmissions by transmitting explicit signalling comprising what may be referred to in accordance with embodiments of the invention as PRACH access denial (or access request denial) messages 604B, 604C. That is to say, once the base station receives PRACH transmissions associated with a RA procedure for one terminal device in a group of terminal devices deemed to have traffic profiles with some common characteristic(s), the base station is configured to send signalling to the other terminal devices in the group to indicate they are denied access to PRACH, at least temporarily, thereby preventing these other terminal devices in the group from initiating their own RA procedures.

Thus, a terminal device receiving a PRACH access denial message according to an embodiment of the invention, such as the terminal devices 508B, 508C in FIG. 6, will not initiate its own random access procedure by sending a random access preamble, even if in accordance with the terminal device's normal operating procedures it would otherwise be ready to invoke a random access procedure. For example, if either one of the terminal devices 508B, 508C reach a state in which they are ready to initiate a random access procedure to request an uplink radio resource allocation to allow them to send a BSR to the base station, they will not do so if they have been denied PRACH access (e.g. through a PRACH access denial message 604B, 604C) if the denial has not yet been lifted. By way of example, the PRACH access denial signalling could be implemented by way of a flag asserted or message contained in a RRC (re)configuration transmitted via the usual means of a PDCCH addressed to the C-RNTI(s) of the relevant terminal device(s) for locating the RRC message on PDSCH. Alternatively, PRACH access denial messaging could be conveyed using an additional bit (flag) asserted or a field added in a DCI (Downlink Control Information) message carried on a PDCCH addressed to the relevant terminal devices' C-RNTIs.

Thus, having received the respective PRACH access denial messages 604B, 604C, the terminal devices 508B, 508C do not initiate any RA procedures of their own, even if they would otherwise have done so. Instead the terminal devices 508B, 508C that have been denied PRACH access wait to receive further communications from the base station, as described further below.

Turning now to the communications between the base station 502 and the terminal device 508A which initiated the RA procedure, the base station 502 having received the scheduling request (SR) from the terminal device 508A in Message 3 603A proceeds to send a contention resolution message 605A to the terminal device 508A, again following conventional RA procedures in respect of the communications associated with the RA procedure initiated by the terminal device 508A.

Again following the conventional LTE signalling procedures associated with the transmission of a BSR, the base station 502 proceeds to transmit to the terminal device 508A an uplink grant for BSR message 606A providing an uplink grant of radio resources on which the terminal device 508A is to transmit its buffer status report.

Having received the uplink grant of radio resources for transmitting its BSR, the terminal device 508A proceeds to transmit a BSR message 607A comprising the BSR to the base station 502.

On receiving the BSR message 607A from the terminal device 508A the base station 502, more particularly, a scheduler of the base station 502, determines an allocation of radio resources to grant to the terminal device 508A to allow the terminal device 508A to transmit the data it has buffered and ready for uplink to the base station 502, and communicates this uplink resource allocation to the terminal device 508A in a buffered data uplink grant message 608A. Subsequently, although not shown in FIG. 6, the terminal device 508A can transmit the buffered data to the base station 502 using the uplink radio resources allocated to the terminal device 508A through the buffered data uplink grant message 608A.

Accordingly, the communications between the base station 502 and the terminal device 508A which initiated the RA procedure as represented in FIG. 6 can be generally conventional. For example, the various signalling messages between the terminal device 508A and the base station 502 may be made in accordance with the established principles of LTE-type network communications. For example, the uplink grant messages 605A, 607A may be made in the usual way using a physical downlink control channel (PDCCH).

However, a significant aspect of the operation represented in FIG. 6 in accordance with an embodiment of the invention which differs from conventional approaches is that the base station 502 is configured to also send uplink grant messages 608B, 608C to the terminal devices 508B, 508C which have not themselves requested uplink resources, and indeed have been denied PRACH access as discussed above to prevent them from being able to request resources. The amount of radio resources allocated to the terminal devices 508B, 508C in this way may correspond with the amount of radio resources allocated to the terminal device 508A which initiated the random access procedure according to the buffer status report received from that terminal device 508A. The uplink grant messages 608B, 608C may be sent to the terminal devices 508B, 508C in accordance with the established principles for granting uplink resources in LTE-type wireless telecommunications systems, for example using PDCCH signalling in the usual way. A scheduler in the base station 502 may operate to allocate the radio resources to the various terminal devices 508A, 508B, 508C in accordance with the established principles that would be applied had the base station received independent buffer status reports from the respective terminal devices. For example, uplink grant signalling 608A, 608B, 608C may be provided over a number of radio subframes, depending on the amount of data for uplink based on the BSR received from the first terminal device 508 in the BSR message 607A in FIG. 6 and the radio resource availability in the cell, etc.

Thus, an underlying principle of this mode of operation is that the base station 502 has associated the terminal device 508A as being a member of a group of terminal devices previously identified as having similar traffic profiles, wherein the group in this example further includes terminal devices 508B, 508C. Thus, the base station allocates radio resources ("grants") for subsequent uplink transmissions from the terminal devices 508B, 508C on the basis of having received a request for an allocation of resources for an uplink transmission from another terminal device 508A in the group. The principle here is that if the terminal device 508A has a particular amount of data to transmit to the base station, it may reasonable to expect other terminal devices 508B, 508C in the same group may have a similar amount of data to transmit to the base station. Accordingly, the base station can pre-emptively allocate resources to the terminal devices 508B, 508C without them having requested such resources. Indeed, in accordance with this embodiment of the invention, the terminal devices 508B, 508C are prevented from asking for resources by virtue of the base station having told them not to through the PRACH access denial messages 604B, 604C discussed above.

Accordingly, this approach in accordance with some embodiments of the invention provides a mechanism for a base station to provide resource allocations to multiple terminal devices in response to a resource request from a single terminal device. An advantage of this approach of predicting when certain terminal devices may have data for uplink based on requests for uplink resources received from another terminal device, and allocating radio resources accordingly, is a potential reduction in the number of requests for resources received by the base station. This can therefore help to reduce the potential for radio interference and congestion in the communication cell served by the base station, in particular in association with random access procedures. In some respects approaches in accordance with embodiments of the invention may thus be seen as providing for pre-emptive resource allocations in respect of terminal devices which have not requested resources, but which have been classified as having a common traffic profile characteristic with another terminal device which has requested uplink resources. The other terminal device which has requested uplink resources in accordance with this example embodiment is simply the first terminal device of the group to initiate a random access procedure through sending a random access preamble to the base station. In this respect, the first terminal within a group of terminal devices which initiates a random access procedure may in effect be considered to become the "master" terminal device or "delegate" terminal device for the group of terminal devices in respect of providing a buffer status report to the base station which the base station will treat as being applicable for all terminal devices in the group and allocate radio resources accordingly.

Having received the uplink grant messages 608B, 608C, the respective terminal devices 508B, 508C may thus transmit any data they have in their buffers to the base station using the allocated resources.

In some cases it may be that the amount of resources allocated to the terminal devices 508B, 508C directly match, or exceed, the amount of data the respective terminal devices have waiting in their buffers for uplink transmission. For example this might be the case if there is a close correspondence between the traffic profiles of the terminal device 508A initiating the random access procedure and the other terminal devices 508A, 508C in the group. For example, this might be expected in situations where the various terminal devices are performing corresponding tasks. For example if each terminal device is associated with a smart-meter configured to record usage data in the same way, and to report the usage data to a server application at roughly the same time, it may be expected that all terminal devices will have very similar amounts of data in the buffer at around the same times. In this case, the terminal devices 508B, 508C may proceed to uplink their buffered data using the resources they have been allocated in the usual way.

However, in other cases, it may be that in fact one or more of the terminal devices 508B, 508C which have been pre-emptively allocated resources by the base station 502 do not currently have any buffered data for uplink. This can arise even within an identified group of terminal devices having generally similar traffic profiles, for example because the traffic profiles are not identical, or because the terminal device 508A initiating the random access procedure did so for a reason that does not apply to the other terminal devices. For example, the terminal device 508A in FIG. 6 may have initiated the random access procedure to transmit uplink data associated with a fault condition that has arisen rather than to uplink data associated with its normal traffic profile on the basis of which it has been classified as being grouped with the other terminal devices.

In some other cases it may be that in fact one or more of the terminal devices 508B, 508C which have been pre-emptively allocated resources by the base station 502 require more resources than they have been allocated to transmit all the data they currently have buffered for uplink.

When a terminal device is pre-emptively allocated uplink resources that either it does not need, or which are not sufficient for its needs, the terminal device may in accordance with some embodiments of the invention be configured to send a rejection/insufficiency indication message 609B, 609C to the base station 502 to indicate this fact. A rejection/insufficiency indication message 609B, 609C may be transmitted by the terminal device 508B, 508C using the resources it has been allocated for uplink through the uplink grant messages 608B, 608C previously received from the base station 502, for example.

A base station 502 receiving a rejection/insufficiency indication message from a terminal device can take appropriate scheduling action.

For example, in response to a rejection indication message (i.e. a message indicating the terminal device does not have any data for uplink and so in effect rejects the grant) the base station may avoid further scheduling for the terminal device.

Conversely, for an insufficiency indication message, the base station may allocate further resources to the terminal device, for example to allow the terminal device to transmit a buffer status report so that further resources can be allocated accordingly, or the base station may simply allocate more uplink resources to the terminal device in one or more subsequent subframe(s) to allow the terminal device to empty its buffers.

In this respect, it may be helpful in some implementations if a terminal device transmitting an insufficiency indication message is configured to communicate an indication of how much resource is currently desired. For example, the terminal device may be configured to transmit as an insufficiency indication message a buffer status report. Thus, a base station receiving a BSR on radio resources pre-emptively allocated to a terminal device may be configured to respond by recognising this is a request for more resources to be allocated, and allocate these resources accordingly. Once the base station has identified the extra resource allocation is requested, the allocation may be made in the usual way. In a variant of this approach a terminal device may instead of transmitting a conventional BSR, transmit what might be termed a differential BSR indicating a difference in an amount of resource between the amount that was allocated by the base station and a desired amount.

In situations where a base station identifies a terminal device in a particular group does not require resources that it has been pre-emptively allocated on the basis of a request from another terminal device, or requires more resources than it has been pre-emptively allocated, the base station may be configured to take account of this and modify the terminal device groupings accordingly. For example, a terminal device which is found to repeatedly not require resources, or require more resources than its fellow group members, might be removed from the group on the basis that its traffic profile is not sufficiently similar to the traffic profile of other terminal devices in the group to merit the above-described approach of pre-emptive resource allocations. Such a terminal device may be moved to another group, or simply removed from any groups associated with pre-emptive resource allocation processes in accordance with embodiments of the invention.

When the base station has allocated resources to all terminal devices in a group, including the allocation to the delegate terminal device 508A of the radio resources it has requested and the corresponding allocations to other terminal devices in the delegate terminal device's group, it may be appropriate for the bar on accessing PRACH placed on the terminal devices 508B, 508C by the PRACH access denial messages 604A, 604B discussed above to be lifted. This is so that any one of the terminal devices in the group which subsequently generates new data for uplink is able to initiate a random access procedure to request resources to transmit the new data to the base station 502. In this respect, whichever of the terminal devices in a group becomes the first terminal device to initiate a new random access procedure may in effect become the new delegate terminal device. Processing may then continue following the principles described above with reference to FIG. 6 (taking account of a potential change in which of the terminal devices is the delegate terminal device).

If a terminal device should fail to use the allocated resources at all, perhaps because it has lost power or is otherwise not receiving downlink signalling or transmitting uplink signalling, then the base station will receive no uplink data transmission and no rejection or insufficiency indication. In some implementations this might cause the base station to assume a failure to receive correctly the transmissions the terminal device is expected to have made, and therefore to begin the use of HARQ procedures by sending a negative acknowledgement to the terminal device. Typically, this would repeat a number of times according to the base station's configuration. Eventually, the limit of attempts to receive the transmission from the terminal would be reached, when the base station might then recognize the terminal device is not active, and possibly remove the terminal device from the group to which it is assigned.

Expiration of the PRACH access denial applied for non-delegate terminal devices may occur in a number of ways in different embodiments. For example, each terminal device may be configured to treat the PRACH access denial as being lifted/expired in respect of its own transmissions after it has received its uplink grant 608B, 608C provided in response to another terminal device requesting resources. In other examples, the terminal devices may be configured to treat the PRACH access denial as having expired after a pre-determined period of time. In still other examples, terminal devices may be configured to treat the PRACH access denial as remaining in force until specific signalling is received from the base station to indicate the PRACH access denial is lifted. A message indicating the PRACH access denial is lifted may, for example, be sent from a base station to terminal devices in a manner corresponding to that in which the PRACH access denial message is sent.

It will be appreciated that the processing represented in FIG. 6 may be modified in accordance with other embodiments of the invention. For example, in some cases the PRACH access denial messages 604B, 604C may be sent at a different time. For example, it may be considered appropriate in some implementations to send the PRACH access denial messages earlier to further reduce the likelihood of another terminal device independently initiating a RA procedure because it has data to upload before being instructed not to. For example, PRACH access denial messages could be sent by the base station to non-delegate terminal devices as soon as an RA preamble is received from another terminal device (which hence becomes the delegate terminal device) in a group with which the remaining non-delegate terminal devices are associated. In the event a terminal device independently initiates a RA procedure when another terminal device in its group has already initiated such a procedure, but before the base station has transmitted any associated PRACH access denial messaging, the base station may be configured to simply ignore the later-received PRACH transmissions. The terminal device whose PRACH transmissions are ignored in accordance with some embodiment of the invention may eventually receive a PRACH access denial message and hence be configured to cease any PRACH (re)transmissions it might otherwise have made.

In accordance with some embodiments of the invention the base station 502 may transmit PRACH access denial messages 604B, 604C to all terminal devices in a group associated with a delegate terminal device which initiates a random access procedure. However, in some other embodiments the base station may send PRACH access denial messages 604B, 604C to only a subset of the terminal devices in a group associated with a delegate terminal device which initiates a random access procedure. Terminal devices which are not sent a PRACH access denial message are therefore still permitted to access PRACH in the usual way, but will nonetheless also be pre-emptively allocated resources in accordance with the principles described above. Terminal devices in a group which are not forbidden to access PRACH (i.e. not sent a PRACH access denial message) could include terminal devices which are classified as having a relatively high priority among the terminal devices in the group, for example. In other cases, however, it may be more appropriate for such terminals devices to be removed from the relevant grouping instead.

In accordance with some embodiments a terminal device may have multiple different traffic profiles associated with multiple different types of data for uplink communication. That is to say, in accordance with some embodiments a terminal device may be associated with more than one traffic class simultaneously and may therefore be considered as being in in more than one group of terminal devices with related traffic profiles. In such cases any signalling to a terminal device denying it access to PRACH may also include an assignment of that denial to a particular traffic class (or classes). Accordingly, it may be that a terminal device is only barred from making PRACH transmissions with respect to those traffic classes, at least when they would normally result in PRACH access. Traffic classes associated with particularly high priority QCIs might be given such exceptions, for example, so that a terminal device can send a BSR overriding that provided by a terminal device which has acted as a group's delegate according to the principles described above with reference to FIG. 6. This could therefore allow a terminal device to provide its own BSR with respect to a particular traffic class faster than would be possible by waiting for the chance to send a rejection or insufficiency indicator as described above.

In the above-described embodiments a base station configured to allocate resources to what might be termed a non-delegate terminal device based on a request for resources received from what might be termed a delegate terminal device is also configured to transmit PRACH access denial signalling to the non-delegate terminal device(s) to indicate the non-delegate terminal device(s) should not attempt to access PRACH, at least temporarily. In the above-described embodiments a terminal device may attempt to access PRACH in the usual manner if it has not previously received RACH access denial signalling (and hence may in fact become a delegate terminal device). However, in accordance with some other embodiments, terminal devices may be configured to determine themselves that they should not attempt to access PRACH resources (i.e. they should not initiate a random access procedure), at least for a period of time, in the expectation they will be allocated radio resources by the base station based on a request for radio resources made by another terminal device. This may in some respects be referred to as PRACH self-denial on the part of the terminal device.

For example, a terminal device may come to a state in, accordance with its normal operation whereby it is ready to initiate a random access procedure. However, rather than doing so, the terminal device may decide instead to delay accessing PRACH in the expectation that another terminal device having a similar traffic profile, and hence classified as being grouped with the terminal device at the base station, will shortly initiate a random access procedure of its own. In effect, certain terminal devices may be configured to wait for another terminal device to become a delegate terminal device to allow the terminal device to receive radio resources without having to access PRACH (e.g. in accordance with the principles set out above with reference to FIG. 6). This approach can be advantageous for the self-denying terminal device as it will save battery power, for example.

To avoid a self-denying terminal device waiting for an undue length of time for another terminal device to initiate a random access procedure, it may be configured to initiate its own random access procedure if another terminal device does not do so within a given time window. The time window adopted for different types of data may be different. For example, data which is considered to have higher priority may be associated with a smaller time window, perhaps even as low as zero time window, corresponding to the self-denying terminal device not denying itself access to PRACH for that particular class of data. In any case, the length and ability to use the self-denial (speculative) PRACH transmission delay window(s) by a terminal device can, for example, be an implementation choice of the terminal device manufacturer and/or configured by the base station via RRC signalling for all or some terminal devices.

As already mentioned, the above-described embodiments primarily focus on implementations in which a base station is configured to transmit PRACH access denial signalling to non-delegate terminal devices to indicate they should not attempt to access PRACH. Thus, in accordance with these examples all terminal devices may assume they may access PRACH unless they are instructed otherwise through PRACH access denial signalling. However, in accordance with other embodiments, terminal devices may be configured to assume they should not attempt to access PRACH unless they are instructed that they may do. Thus, instead of simply allowing whichever terminal device first initiates each random access procedure to become the delegate terminal device, in some embodiments one or more terminal devices may be pre-defined as a delegate terminal device and instructed that they may access PRACH whilst other terminal devices may be configured to not access PRACH and to rely solely on pre-emptive resource allocations of the kind described above. A base station may select one or more terminal devices to be allowed PRACH access (and hence act as a delegate terminal device) for the terminal devices of a particular group of terminal devices with related traffic profiles randomly or systematically. For example, the selection of one or more potential delegate terminal devices from within a group of terminal devices may be made on the basis of radio channel quality information associated with the respective terminal devices. For example, terminal devices with higher quality radio channel communications with the base station, for example because they are nearer to the base station, may be selected as potential delegate terminal devices to help with the probability that PRACH transmissions arrive at the base station quickly, allowing any subsequent denial signalling to be sent as early as possible and for the received signal quality on the preamble to be as good as possible. Thus the selection may be based on calculations performed but at the base station taking account of parameters such as Timing Advance (TA) associated with the terminal devices in the group. Other metrics which might be used include the (filtered, layer 3) radio resource management (RRM) measurements based on RSRP (reference signal received power)/RSRQ (reference signal received quality), or SRS (sounding reference signal) measurements at the base station.

In accordance with some other example embodiments, terminal devices operable in accordance with the principles described above might be provided with a configuration relevant to MBSFN (Multicast Broadcast Single Frequency Network) operation, wherein at the physical layer certain subframes within certain radio frames may be defined as for use only for multicast or broadcast data. To each group of terminal devices can be associated an MBMS (Multimedia Broadcast Multicast Service) service. Then, PRACH denial signalling might be multicast to a group of terminal devices using MBMS, thereby helping reduce the resources used for this signalling as compared to individual signalling to each of the potentially many access-denied ("barred") terminal devices. Only terminal devices configured with the MBMS service for which the PRACH denial is sent might then act in response to it (by suppressing RACH accesses). In accordance with this approach the base station need not know how many terminal devices are presently in the group, allowing them to be switched on and off without informing the network or requiring a variable amount of resource to transmit PRACH denial signalling.

In example implementations in accordance with embodiments of the invention, there are various ways in which terminal devices can be configured to only access PRACH if they are one of the pre-defined allowable dedicated terminal devices are selected by the base station. For example, in a system where terminal devices are configured to generally assume they are allowed to access PRACH, the base station may be configured to send PRACH denial signalling to all terminal devices, apart from the selected potential delegate terminal device(s), even if there is no currently on-going random access procedure from a terminal device in the associated group of terminal devices. Alternatively, in a system where terminal devices are configured to generally assume they are not allowed to access PRACH, the base station may be configured to send signalling to the selected potential delegate terminal device(s) to indicate they are allowed to access PRACH.

In accordance with further embodiments of the invention, a wireless telecommunications system may operate in a device-to-device (D2D) mode whereby the terminal devices communicate directly with one another using the same cellular technology (or possibly a different wireless bearer) as they use to communicate with the infrastructure network/base station provided by the operator. Such D2D architectures can have various advantages known in the art, including but not limited to, network-side power reduction, RAN traffic load reduction, and terminal-side power reduction. Thus, terminal devices operating in a D2D mode and requiring an allocation of uplink resource can send a BSR (or actual uplink data depending on the specific D2D implementation) to one designated terminal device which collates them to generate a total group BSR and provides this to the network via RACH in accordance with broadly conventional techniques. Having sent their own BSR to the designated terminal device, the other terminal devices may be configured to regard themselves as being prohibited from accessing RACH/PRACH in their own right. In accordance with principle similar to those described above with regards to FIG. 6, the base station scheduler may then schedule the entire group of terminal devices and provide the relevant uplink grants on PDCCH. These may either be transmitted to each terminal device individually or to the delegate terminal device for onward D2D transmission to the individual terminal devices according to the specific D2D implementation at hand. The C-RNTIs of the terminal device in the D2D set are assumed to be known to the base station to support this downlink signalling of uplink grants.

Thus, there has been described various ways in which a base station may conveniently allocate resources to one terminal device based on a request received from another terminal device where the two terminal devices are classified as being in a group on the basis of their expected traffic profiles, for example, taking account of predicted timings and amounts of data for uplink from the respective terminal devices. In doing this, it can be possible to schedule uplink resources for a plurality of terminal devices with less signalling associated with random access procedures than would otherwise be the case. The associations among terminal devices (i.e. the groupings) may be maintained (and potentially modified) by the base station, for example based on inherent characteristics of the devices, such as their operating functions, or based empirically on previous data transfer behaviour associated with the respective terminal devices. In general, the terminal devices do not need to be aware of what other terminal devices are in their group, and as such the associations between terminal devices may be maintained internally at the base station without communication to the terminal devices.

Thus, embodiments of the invention can help reduce the potentially impact of PRACH to PUSCH interference, especially in the context of a narrowband LTE-type carrier, such has been proposed for so-called virtual carriers, and also in the context of MTC terminal devices which may be deployed more densely than other types of terminal device, and furthermore may be more predictable and similar in their traffic profiles. By reducing, potentially to one, the number of terminal devices in a traffic group that have permission to access PRACH for a given time, the potential interference to PUSCH can be correspondingly reduced.

Furthermore, in accordance with some embodiments of the invention there may be an overall reduction in transmissions and retransmissions from terminal devices as compared to conventional systems because transmissions on PRACH are carried out only by the delegated terminal device(s) among a group. This can reduce power consumption for terminal devices, thus increasing their battery life. This can be particularly relevant for MTC devices.

Furthermore, in accordance with some embodiments contention on RACH could be reduced by virtue of the delegation of the random access procedure to a restricted number of terminal devices, for example to the first terminal device to transmit PRACH among a group rather than continuing to allow them all to potentially contend. This could further reduce terminal device power consumption for most terminal devices in a group, and also help reduce the latency of RACH.

Furthermore, in accordance with some embodiments there may be reduced uplink intercell interference because of the potential reduction in the amount of uplink PRACH transmissions.

Some significant differences associated with certain embodiments of the invention as compared to conventional approaches include following:

The concept of one terminal device acting as a random access delegate for a group of terminal devices is not known in conventional systems. For example, in a conventional LTE-type network each terminal device is responsible for its own scheduling requests, BSRs, and RACH procedures.

Allowing a terminal device to remain connected to a cell but to be explicitly denied access to PRACH/RACH by downlink signalling is not available in conventional wireless telecommunications systems.

Conventional wireless telecommunications system do not allow for a base station to allocate uplink resources to a terminal device which has not requested them.

The concept of providing for a differential BSR to allow a terminal device to communicate a desired adjustment to an amount of resource it has been allocated is not available in conventional wireless telecommunications networks.

Conventional wireless telecommunications networks do not allow for a terminal device to speculatively delay its own PRACH transmission in the hope that another terminal device may act as a group delegate is not previously disclosed (linked with the first bullet point). The network-based configuration version of this embodiment represents a departure from current LTE specifications where no such capability exists.

It will be appreciated that various modifications can be made to the embodiments described above without departing from the scope of the present invention as defined in the appended claims. In particular although embodiments of the invention have been described with reference to a LTE mobile radio network, it will be appreciated that the present invention can be applied to other forms of network such as GSM, 3G/UMTS, CDMA2000, etc. The term user equipment (UE) as used herein can be replaced with other terms user equipment (UE), mobile communications device, terminal device etc. Furthermore, although the term base station has been used interchangeably with eNodeB it should be understood that there is no difference in functionality between these network entities.

Thus, there has been described a method of allocating radio resources for uplink transmissions in a wireless telecommunications system, the method comprising: a first terminal device communicating a request for an allocation of radio resources to a base station; the base station determining there is an association between the first terminal device and a second terminal device based on their having similar predicted traffic profiles for uplink data; and the base station establishing a radio resource allocation for the second terminal device based on the resources requested by the first terminal device, and consequently transmitting radio resource allocation messages to allocate radio resources to the first and second terminal devices for respective uplink transmissions based on the request for an allocation of radio resources received from the first terminal device.

Thus in some respects certain embodiments of the invention provide for schemes to help allow one UE to act as a delegate for a group of UEs with respect to accessing RACH and making transmissions on PRACH. The group of UEs may have something common about their expected traffic profiles, for example QCIs, so that when a buffer status report (BSR) is triggered at one UE, the eNB can assume that a similar BSR is likely to be about to be triggered at the other UEs in the group. Therefore, the eNB can conduct the uplink (UL) scheduling process with this assumption and signal to the other UEs in the traffic profile group a denial of permission to transmit PRACH for the time being. After providing a determined UL schedule to all UEs in the group via usual PDCCH DCI messages, some embodiments allow UEs to reject the scheduled grants or indicate that they are insufficient. Embodiments of the invention may therefore help reduce interference between PRACH and PUSCH/PUCCH by in effect reducing the number of UEs likely to be transmitting PRACH at any one time simultaneously and in a similar manner could help reduce the load on RACH and the probability of RACH contention.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] ETSI TS 122 368 V10.530 (2011-07)/3GPP TS 22.368 version 10.5.0 Release 10
[2] Holma H. and Toskala A, "LTE for UMTS OFDMA and SC-FDMA based radio access", John Wiley and Sons, 2009
[3] ETSI TS 136 321 V10.6.0 (2012-10)/3GPP TS 36.321 version 10.6.0 Release 10
[4] ETSI TS 136 300 V10.8.0 (2012-07)/3GPP TS 36.300 version 10.8.0 Release 10
[5] UK patent application GB 1101970.0
[6] UK patent application GB 1101981.7
[7] UK patent application GB 1101966.8
[8] UK patent application GB 1101983.3
[9] UK patent application GB 1101853.8
[10] UK patent application GB 1101982.5
[11] UK patent application GB 1101980.9
[12] UK patent application GB 1101972.6
[13] UK patent application GB 1121767.6
[14] UK patent application GB 1121766.8
[15] ETSI TS 123 401 V10.8.0 (2012-07)/3GPP TS 23.401 version 10.8.0 Release 10
[16] ETSI TS 123 203 V10.7.0 (2012-07)/3GPP TS 23.203 version 10.7.0 Release 10

The invention claimed is:

1. A method of operating a base station for allocating radio resources for uplink transmissions in a wireless telecommunications system, the method comprising:
  receiving a request for an allocation of radio resources from a first terminal device;
  determining an association between the first terminal device and a second terminal device; and
  transmitting a radio resource allocation message to allocate radio resources to the second terminal device for an uplink transmission in response to receiving the request for an allocation of radio resources from the first terminal device, wherein
  the wireless telecommunications system is associated with a radio interface spanning a system frequency bandwidth for supporting radio communications with a first type of terminal device and comprising a restricted frequency bandwidth for supporting radio communications with a second type of terminal device, wherein the restricted frequency bandwidth is narrower than and within the system frequency bandwidth, and wherein the first and second terminal devices are terminal devices of the second type.

2. A method according to claim 1, wherein the request for an allocation of radio resources from the first terminal device is received on a random access channel of the wireless telecommunications system.

3. A method according to claim 1, wherein the request for an allocation of radio resources from the first terminal device is associated with a random access procedure of the wireless telecommunications system.

4. A method according to claim 1, wherein the radio resources allocated to the second terminal device correspond with an allocation of radio resources requested by the first terminal device.

5. A method according to claim 1, wherein the association between the first terminal device and the second terminal device is established based on the first terminal device and the second terminal device having a common characteristic relating to their uplink transmissions.

6. A method according to claim 1, wherein the association between the first terminal device and the second terminal device is established based on the first terminal device and the second terminal device being associated with a same terminal device classifier.

7. A method according to claim 6, wherein the terminal device classifier is a quality class indicator of respective bearers associated with the respective terminal devices.

8. A method according to claim 1, further comprising transmitting an access request denial message to the second terminal device to instruct the second terminal device not to make its own request for an allocation of radio resources.

9. A method according to claim 8, further comprising transmitting a cease access request denial message to the second terminal device after having transmitted the access request denial message to instruct the second terminal device that it is now allowed to make its own request for an allocation of radio resources.

10. A method according to claim 1, further comprising transmitting an access request allow message to the first terminal device to instruct the first terminal device that it is allowed to make the request for the allocation of radio resources.

11. A method according to claim 10, further comprising selecting the first terminal device from a plurality of terminal devices as the terminal device to which the access request allow message is transmitted based on a transmission characteristic associated with respective ones of the plurality of terminal devices.

12. A method according to claim 11, wherein the transmission characteristic is selected from the group comprising: a timing advance; a reference signal received power, a reference signal received quality, a sounding reference signal measurement at the base station, and a radio channel quality indicator.

13. A method according to claim 1, further comprising determining an association between the first terminal device and a further terminal device; and transmitting a radio resource allocation message to the further terminal device to allocate radio resources for an uplink transmission from the further terminal device based on the request for an allocation of radio resources from the first terminal device.

14. A method according to claim 1, further comprising determining an association between the first terminal device and a plurality of other terminal devices, transmitting an access request denial message to a subset of the plurality of other terminal devices to instruct the subset of the plurality of other terminal devices not to make their own requests for an allocation of radio resources, and transmitting radio resource allocation messages to the plurality of other terminal devices to allocate radio resources for respective uplink transmissions from respective ones of the plurality of other terminal devices based on the request for an allocation of radio resources from the first terminal device.

15. A method according to claim 1, further comprising receiving a transmission from the second terminal device using the radio resources allocated to the second terminal device.

16. A method according to claim 15, wherein the transmission received from the second terminal device comprises an indication that the second terminal device does not require some or any of the allocated resources for uplink transmission.

17. A method according to claim 15, wherein the transmission received from the second terminal device comprises an indication of a request for a further allocation of radio resources for a further uplink transmission from the second terminal device.

18. A method according to claim 1, wherein the request for an allocation of radio resources received from the first terminal device comprises a request for an allocation of radio resources to allow the first terminal device to transmit a buffer status report to the base station.

19. A base station configured to allocate radio resources for uplink transmissions in a wireless telecommunications system, the base station comprising:
a transceiver configured to receive a request for an allocation of radio resources from a first terminal device; and
circuitry configured to determine an association between the first terminal device and a second terminal device and to control the transceiver to transmit a radio resource allocation message to allocate radio resources to the second terminal device for an uplink transmission in response to receiving the request for an allocation of radio resources from the first terminal device, wherein
the wireless telecommunications system is associated with a radio interface spanning a system frequency bandwidth for supporting radio communications with a first type of terminal device and comprising a restricted frequency bandwidth for supporting radio communications with a second type of terminal device, wherein the restricted frequency bandwidth is narrower than and within the system frequency bandwidth, and wherein the first and second terminal devices are terminal devices of the second type.

20. A method of operating a base station for allocating radio resources for uplink transmissions in a wireless telecommunications system, the method comprising:
receiving a request for an allocation of radio resources from a first terminal device;
determining an association between the first terminal device and a second terminal device;
transmitting an access request allow message to the first terminal device to instruct the first terminal device that it is allowed to make the request for the allocation of radio resources;
selecting the first terminal device from a plurality of terminal devices as the terminal device to which the access request allow message is transmitted based on a transmission characteristic associated with respective ones of the plurality of terminal devices; and transmitting a radio resource allocation message to allocate radio resources to the second terminal device for an uplink transmission in response to receiving the request for an allocation of radio resources from the first terminal device.

\* \* \* \* \*